United States Patent
Schutt

(10) Patent No.: US 7,810,857 B2
(45) Date of Patent: Oct. 12, 2010

(54) PROTECTOR

(75) Inventor: Carl Schutt, McKinnon (AU)

(73) Assignee: Labrricon Pty Ltd, Box Hill Victoria (AU)

( * ) Notice: Subject to any disclaimer, the term of this patent is extended or adjusted under 35 U.S.C. 154(b) by 628 days.

(21) Appl. No.: 11/721,741

(22) PCT Filed: Dec. 15, 2005

(86) PCT No.: PCT/AU2005/001887

§ 371 (c)(1),
(2), (4) Date: Aug. 1, 2007

(87) PCT Pub. No.: WO2006/063394

PCT Pub. Date: Jun. 22, 2006

(65) Prior Publication Data

US 2008/0129060 A1    Jun. 5, 2008

(30) Foreign Application Priority Data

Dec. 15, 2004    (AU) ............................... 2004907157

(51) Int. Cl.
*B60R 19/44* (2006.01)
(52) U.S. Cl. ..................... 293/102; 293/120; 293/155
(58) Field of Classification Search ................ 293/155, 293/102, 120, 122; 267/139, 140
See application file for complete search history.

(56) References Cited

U.S. PATENT DOCUMENTS

| | | | |
|---|---|---|---|
| 1,348,030 A | 7/1920 | Millard | |
| 3,539,173 A | 11/1970 | Sampson | |
| 3,664,075 A | 5/1972 | Hazlewood et al. | |
| 3,986,577 A | 10/1976 | Ebbesson et al. | |
| 5,560,662 A * | 10/1996 | Apgar et al. | ................ 293/121 |
| 5,661,934 A | 9/1997 | Weisflog | |

FOREIGN PATENT DOCUMENTS

| | | |
|---|---|---|
| DE | 2137176 A1 | 2/1973 |
| DE | 2513880 A1 | 10/1975 |
| FR | 2767508 A1 | 2/1999 |
| GB | 1470129 A | 4/1977 |
| GB | 2037932 A | 7/1980 |
| JP | 50 143239 A | 11/1975 |
| NL | 7504312 A | 10/1975 |
| SE | 7404998 A | 10/1975 |
| WO | WO 2004/058611 A1 | 7/2004 |
| WO | WO 2004/098956 A1 | 11/2004 |

* cited by examiner

Primary Examiner—Joseph D Pape
(74) Attorney, Agent, or Firm—Knobbe Martens Olson & Bear LLP

(57) ABSTRACT

A protector assembly for attachment to a vehicle such as a truck. The assembly includes a base member which is permanently attached to the truck and a cushion member which is retained adjacent the base member by retainer. The cushion member is slidable relative to the base member between the retention position and a release position whereby in the release position the cushion member is no longer retained by the retainer. The cushion member includes a mounting portion formed from a relatively hard material which engages the retainer, and a working portion formed from a relatively soft resilient elastomeric material.

18 Claims, 3 Drawing Sheets

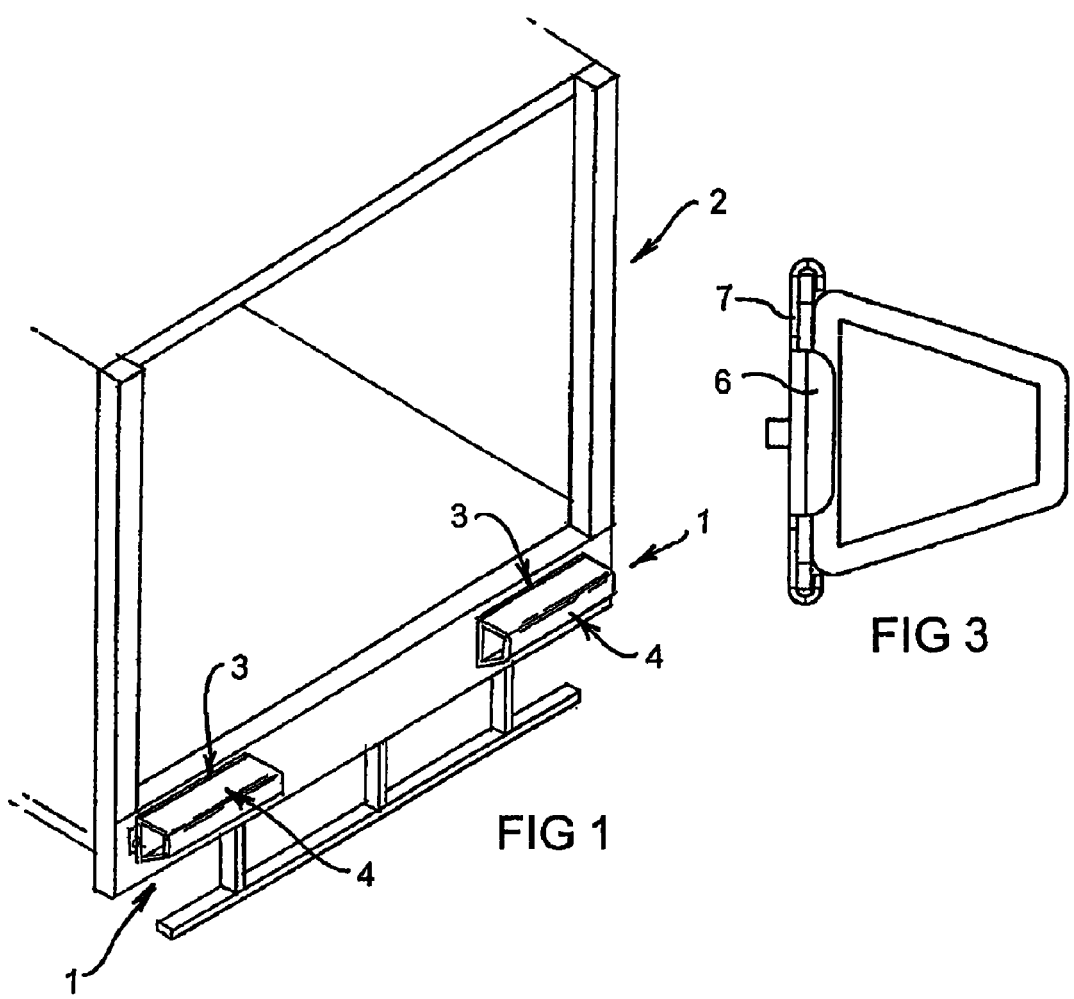
FIG 3
FIG 1
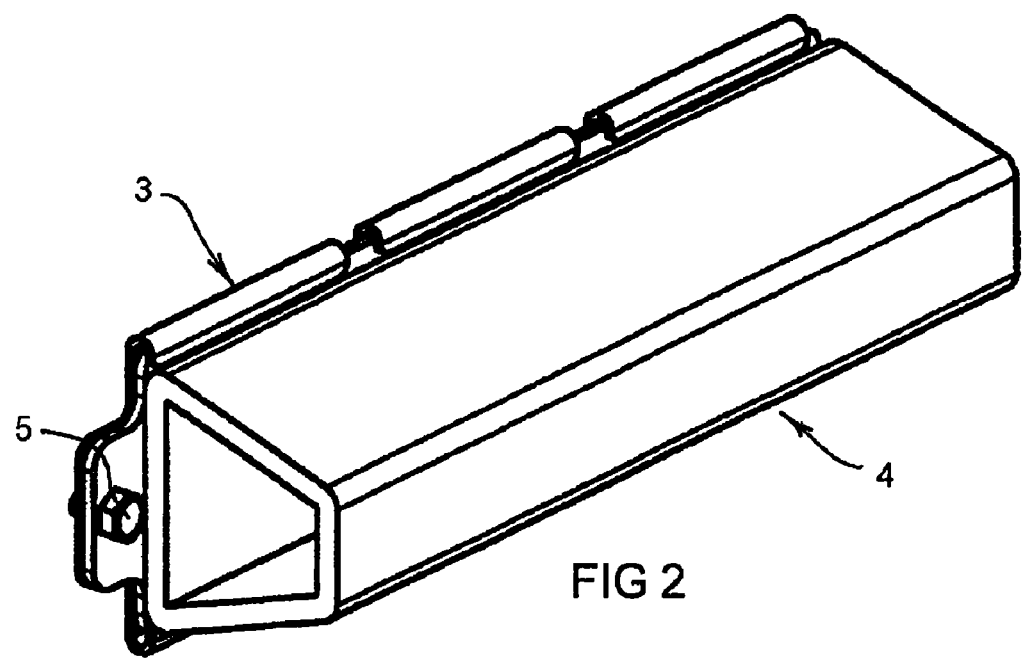
FIG 2

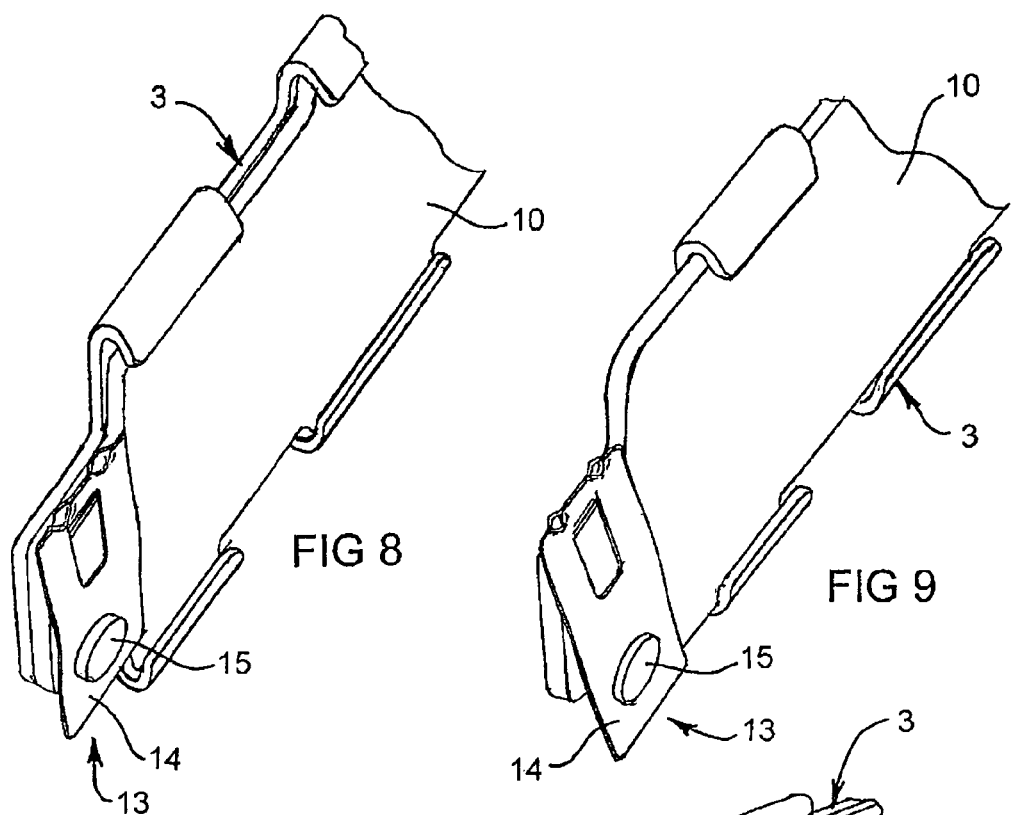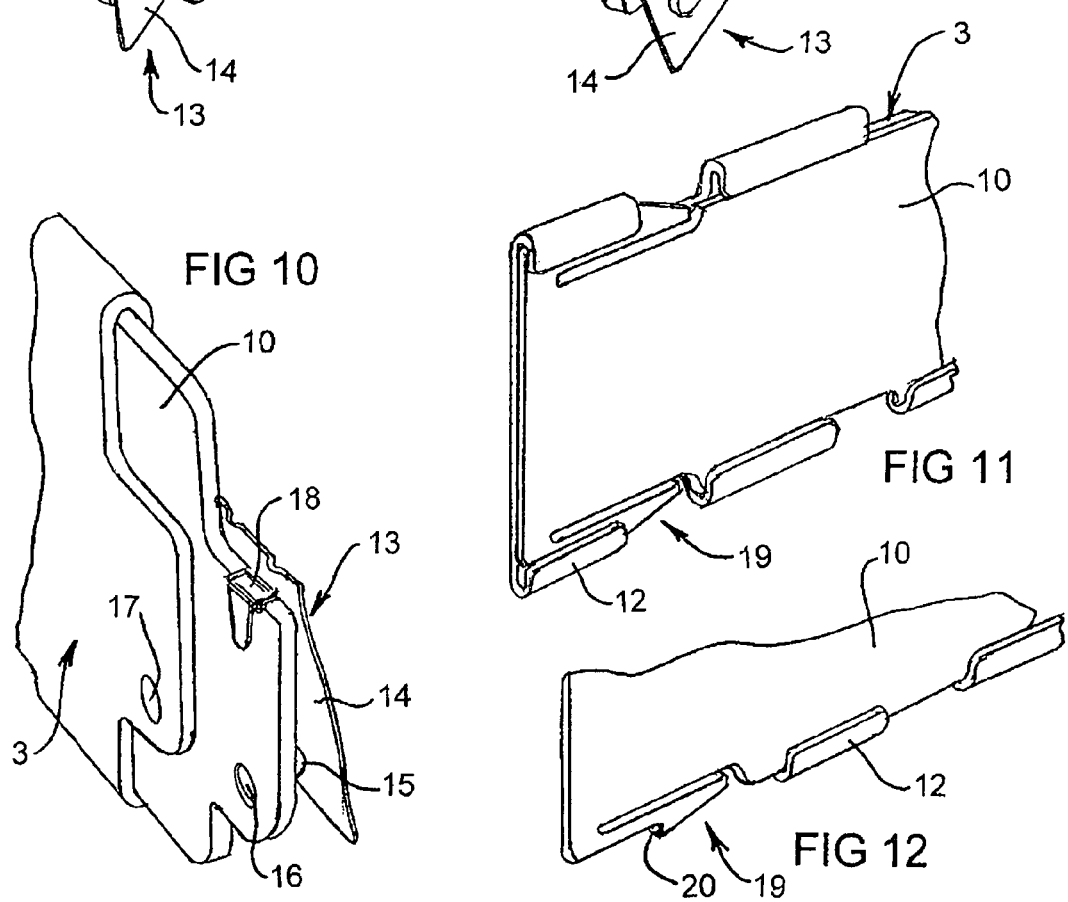

PROTECTOR

This application is U.S. National Phase of International Application PCT/AU2005/001887, filed Dec. 15, 2005 designating the U.S., and published in English as WO 2006/063394 on Jun. 22, 2006, which claims priority to Australian Patent Application No. 2004907157 filed Dec. 15, 2004.

This invention relates to a protector assembly for protecting vehicles from impact forces. The protector has a particular application in relation to land based vehicles such as trucks and it will be convenient to hereinafter describe the invention with the reference to this particular application. It should be appreciated however that the invention may have applications for non land based vehicles such as boats.

Vehicles such as trucks move goods from point to point and it is generally desirable to minimise the time the truck spends stationary during loading and unloading. Elevated docking platforms located at those points have made considerable time savings in loading and unloading, as they provide a platform at the level which is substantially similar to the level of the tray of the truck. It is generally preferable for the truck chassis or tray to engage the platform, or the structure supporting the platform. This aims to minimise the space between the platform and the tray, as any space may be problematic for the loading and unloading process. Given that the platform is part of a relatively immovable structure, engaging the platform applies impact forces to the truck at the point of impact, which can damage the truck if it is not protected.

A solution known to the applicant has been to attach a protector, to the truck at the likely point or points of impact. The protection is generally in the form of a length of extruded rubber which may be hollow in cross section. The protector can be attached by fasteners such as bolts extending through holes drilled in the rubber and fastened to the truck with nuts. This form of fastener generally requires the drilling of a plurality of mounting holes in the rear face of the rubber and a plurality of clearance holes in the front face of the rubber. Alternatively a metal clamping bar can be used which extends through the hollow and is attached to the truck by a nut and bolt fastener at opposing ends of the bar.

The drilling of holes in the rubber section tends to weaken the protector and cause the rubber to split between the drilled holes. This reduces the ability of the rubber to protect the vehicle. Furthermore the split rubber exposes the fasteners, which can be damaged by the impact forces. The damaged fasteners lose their ability to hold the rubber in place and increases the difficulties of removal for replacement of a new rubber. This results in greater movement of the rubber which leads to further wear of the rubber about the drilled holes. Furthermore damaged fasteners can be difficult to remove.

Where a clamping bar is used, considerable clamping force is required to retain the rubber in place. Furthermore the position of the fasteners at opposed ends of the bar, outside the ends of the rubber leaves them exposed to be damaged by the impact forces. The damaged fasteners lose their ability to hold the rubber in place and increases the difficulties of removal for replacement of a new rubber. This results in movement and further wear of the rubber.

Current legislation requires a protector, if fitted to a truck, to be in good working order as a condition of roadworthiness for the vehicle. Owners run the risk of having their vehicles put off the road if they are driven with a damaged protector. A protector can be removed relatively easily if the fasteners are not damaged. However where the fasteners are damaged they may need to be cut from the vehicle. This can lead to considerable downtime for the vehicle.

It is an aim of this invention to provide an improved protector for protecting vehicles from impact forces that is relatively robust and relatively simple to fit to the vehicle.

According to this invention there is provided a protector assembly for protecting a vehicle from impact forces, the assembly includes:

a cushion member for receiving the impact forces, a base member which in use is attached to the vehicle, the base member having retention means for retaining the cushion member in a retention position adjacent the base member, the cushion member being slidable relative to the base member between the retention position and a release position whereby in the release position the cushion member is no longer retained by the retention means, the cushion member includes a mounting portion which engages the retention means of the base member, and a working portion formed from a relatively soft resilient elastomeric material, the mounting portion is formed from a relatively hard material so that the mounting portion is relatively more rigid than the working portion so as to facilitate locating the cushion member in the rotation position.

The cushion member preferably includes a mounting portion which engages the retention means of the base member, and a working portion secured to the mounting portion which in use absorbs the impact loads. The working portion may be formed separately from the mounting portion and subsequently bonded thereto, or alternatively the working portion may be formed integrally with the mounting portion. The working portion is preferably formed from a relatively soft resilient elastomeric material. The working portion is preferably formed as a hollow section by an extrusion process.

The mounting portion is preferably formed from a relatively hard material so that the mounting portion is relatively more rigid than the working portion. The mounting portion is preferably substantially planar having an edge region which is engaged by the retention means of the base member.

The retention means is preferably located at an edge region of the base member. The retention means is preferably formed by opposing side edges of the base member that are curved inwardly to define a recess for accommodating the edge region of the cushion member. The base member is preferably formed with a stop at a distal end thereof to limit the sliding movement of the cushion member relative to the base member. It is preferred that the opposing side edges of the base member and corresponding opposing side edges of the mounting portion be formed with castellations which in use reduce the distance required to slide the cushion member relative to the base member between the retention and release positions.

The protector assembly preferably includes a fastening means for fastening the cushion member in the retention position. It is preferred that a proximal end of the base member and a proximal end of the cushion member be formed with an aperture extending therethrough, the aperture in the base member aligning with the aperture in the cushion member when the cushion member is in the retention position, whereby the fastening means extend through the apertures for retaining the cushion member in the retention position. The fastening member is preferably a bolt with a lock nut.

It is preferred that the fastening member is a bolt with a lock nut wherein the shaft of the bolt is located in the aperture.

The fastening means may alternatively include a clip having a lug which is located in the aperture.

The fastening means may be formed integrally with the cushion member and/or the base member.

The fastening means may include at least one detent formed integrally with the mounting portion.

It is preferred that the detent is biased towards an active position, in which position it engages the base member to fasten the cushion member in the retention position.

The detent may also include an abutment which abuts the retention means when the detent is in the active position.

It will be convenient to hereinafter describe the invention with reference to the following drawings which show four preferred embodiments of the protector according to the invention. The particularity of the attached drawings and following description should not supersede or limit the preceding broad definition of the invention.

FIG. 1 illustrates an isometric view of a rear of a truck fitted with two protector assemblies according to the invention.

FIG. 2 illustrates an isometric view of a protector assembly from a proximal end thereof.

FIG. 3 illustrates a distal end elevation of the protector assembly.

FIG. 8 illustrates an isometric view of the base member and mounting portion with an alternate form of fastening means in the active position.

FIG. 9 illustrates the features of the protector from FIG. 8 with the fastening means in an inactive position.

FIG. 10 illustrates a rear view of the features of the protector from FIG. 8.

FIG. 11 illustrates an isometric view of the base member and an alternate form of mounting portion.

FIG. 12 illustrates the features of the protector from FIG. 11 with the mounting portion moved from the retention position.

Figure 4:
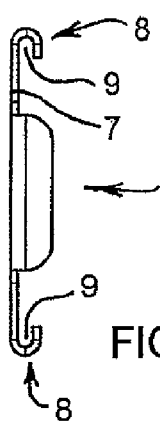
FIG. 4 illustrates a distal end elevation of a base member.

FIG. 1 illustrates the preferred embodiment of a protector assembly 1 according to the invention as attached to the rear of a truck 2. In summary the protector 1 includes a base member 3 which is relatively permanently attached to the truck 2 and a cushion member 4 which is retained by the base member 3. The base member 3 may be attached to the truck 2 by any means suitable however it is preferred that the base member be welded to the vehicle. The position of attachment of the protector assembly shown is for illustrative purposes only. The protector assembly 1 may be attached at other locations on the vehicle.

FIG. 2 illustrates an isometric view of the protector assembly 1 from a proximal end thereof. The cushion member 4 is illustrated in a retention position relative to the base member 3, whereby the cushion member 4 is being retained by the base member 3. More specifically the cushion member 4 is retained in a position adjacent the base member 3. The means by which the base member 3 retains the cushion member 4 will be discussed later in the specification. The cushion member 4 is secured in the retention position by fastening means 5 extending through apertures 13 (see FIG. 6) formed in both the cushion member 4 and the base member 3, which apertures are aligned when the cushion member 4 is in the retention position. The fastening means 5 illustrated is in the form of a nut and bolt however it ought to be appreciated that other forms of fastening means 5 may also be suitable. Examples of other forms of fastening means will be discussed later in the specification with reference to FIGS. 8 to 12.

FIG. 3 illustrates an end elevation of the protector assembly 1 from a distal end thereof. The distal end illustrated includes a stop 6 in the form of a portion of the distal end of the base member 3 being bent in a direction transverse to a planar portion 7 of the base member 3. This stop 6 limits the ability of the cushion member 4 to move beyond the distal end of the base member 3. Clearly other forms of stop may be suitable.

Figure 5:
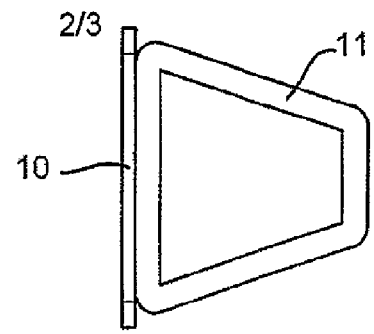
FIG. 5 illustrates a distal end elevation of a cushion member.

FIG. 4 illustrates an end elevation of the base member 3 from a distal end thereof. The base member 3 is preferably formed from metal. The base member 3 includes retention means 8 for retaining the cushion member 4 adjacent the base member 3. The retention means 8 illustrated is formed by opposing longitudinally extending edges of the base member 3 being folded to define a recess 9. This recess 9 accommodates a mounting portion 10 of the cushion member 4 which is illustrated in FIG. 5. The retention means 8 illustrated restrains the cushion member 4 from moving in a direction transverse to the plane of the planar portion 7. The mounting portion 10 is preferably formed from a relatively stiff material.

FIG. 5 more clearly shows the cushion member 4 having in addition to the mounting portion 10, a working portion 11 attached to the mounting portion 10. The working portion 11 illustrated is a hollow section which is preferably formed from a relatively soft elastomeric material. The working section need not be hollow. However, the hollow defines a space into which the working portion 11 can collapse when receiving an impact force. The mounting portion 10 may be formed separately from the working portion 11 or formed integrally with the working portion 11.

Figure 6:
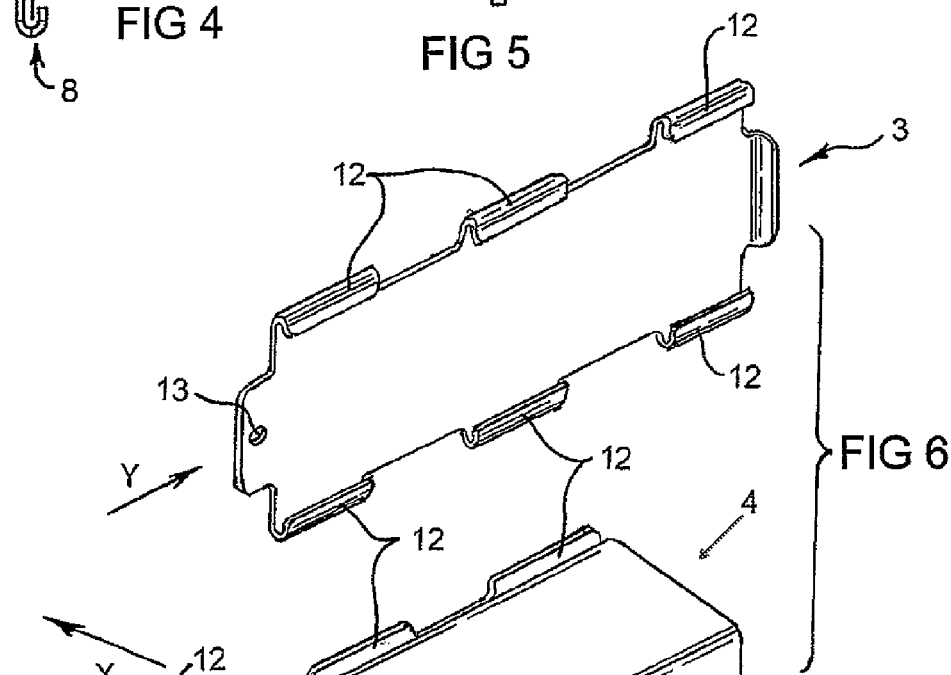
FIG. 6 illustrates an isometric view of the cushion member separated from the base member from FIG. 2.
Figure 7:
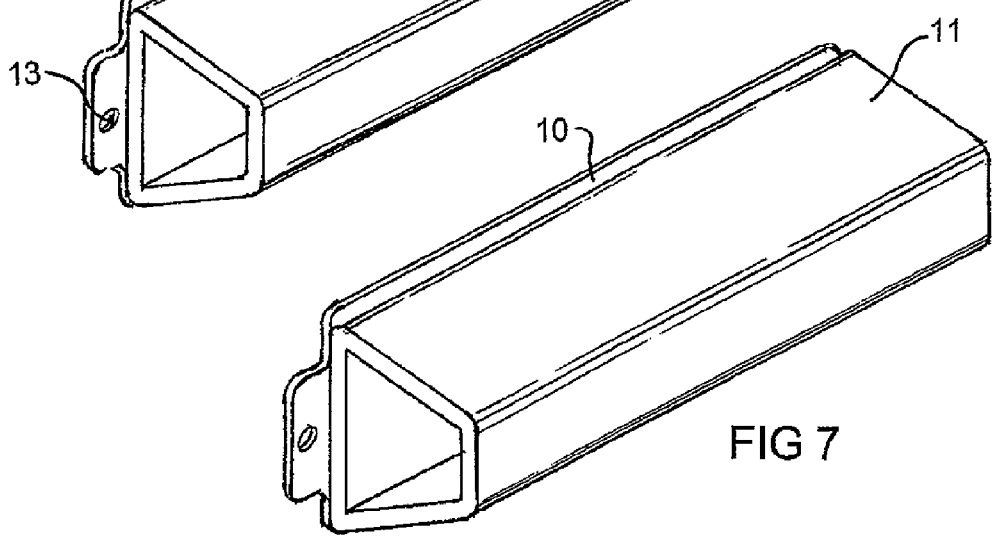
FIG. 7 illustrates an isometric view from a proximal end of another embodiment of the cushion member.

FIG. 6 illustrates both the base member 3 and mounting portion 10 of the cushion member 4 having longitudinal edges formed with castellations 12. The formation of castellations 12 enables the cushion member 4 to be brought adjacent to the base member 3 by moving the cushion member 4 in the direction X as shown in FIG. 6, and thereafter moving to the retention position by sliding in the direction Y. Alternatively the mounting portion 10 need not be formed with castellations 12, an example of which is illustrated in FIG. 7. It ought to be appreciated that where the mounting portion 10 is not formed of castellations 12, it must be slid the full distance from the proximal to distal ends of the base member 3 to move from the release to retention positions respectively.

Referring now to FIG. 8 which illustrates the base member 3 and the mounting portion 10 with the working portion removed therefrom to simplify the illustration. The illustration shows a fastening means in the form of a clip 13 which acts to fasten the mounting portion 10 in the retention position. The clip 13 shown in FIG. 8 is shown in the active position. The clip 13 must be moved to an inactive position as shown in FIG. 9 in order to allow the mounting portion 10 to be moved from the retention position. The clip 13 includes a substantially planar member 14 with a lug 15 extending from the rear surface thereof as best illustrated in FIG. 10. The lug 15 is located in apertures 16, 17 formed in the mounting portion 10 and base 3 when the clip 13 is in the active position. Removing the lug 15 from the apertures 16, 17 enables the mounting portion 10 to slide relative to the base member 3. The clip 13 also includes an arm 18 extending from the rear of the planar member 14 which is located between the base member 3 and the mounting portion 10 to retain the clip 13 adjacent the mounting portion 10.

Referring now to FIG. 11 which illustrates an alternative form of fastening means to that illustrated in FIGS. 8 to 10 whereby the fastening means is formed integrally with the mounting portion 10. The fastening means illustrated is in the shape of an arrow head 19 as is best illustrated in FIG. 12. The arrow head includes a shoulder 20 which can be located behind one of the castellations 12 of the base member 3 when the mounting portion 10 is in the retention position. The arrow head 19 or more specifically the shoulder 20 needs to be moved from engaging the castellation 12 so as to locate within the recess 9 to allow the mounting portion 10 to slide relative to the base 3.

Various alterations and or additions may be made to the rubber protector as hereinbefore described without departing from the spirit or ambit of the invention.

The invention claimed is:

1. A protector assembly for protecting a vehicle from impact forces, the assembly comprises:
   a cushion member for receiving the impact forces,
   a base member which in use is attached to the vehicle, the base member having a retainer for retaining the cushion member in a retention position adjacent the base member, the cushion member being slidable relative to the base member between the retention position and a release position whereby in the release position the cushion member is no longer retained by the retainer, the cushion member comprises a mounting portion which engages the retainer of the base member, and a working portion formed from a relatively soft resilient elastomeric material, the mounting portion is formed from a relatively hard material so that the mounting portion is relatively more rigid than the working portion so as to facilitate locating the cushion member in the retention position.

2. A protector according to claim 1 wherein the working portion is formed separately from the mounting portion and subsequently bonded thereto.

3. A protector according to claim 1 wherein the working portion is formed integrally with the mounting portion.

4. A protector according to claim 1 wherein the working portion is formed as a hollow section.

5. A protector according to claim 1 wherein the mounting portion is substantially planar having an edge region which is engaged by the retainer of the base member.

6. A protector according to claim 5 wherein the retainer is located at an edge region of the base member.

7. A protector according to claim 6 wherein the retainer is formed by inwardly curved opposing side edges of the base member that define a recess for accommodating the edge region of the mounting portion.

8. A protector according to claim 1 wherein the base member is formed with a stop at a distal end thereof to limit the sliding movement of the cushion member relative to the base member.

9. A protector according to claim 1 wherein opposing side edges of the base member and corresponding opposing side edges of the mounting portion are formed with castellations which in use reduce the distance required to slide the cushion member relative to the base member between the retention and release positions.

10. A protector according to claim 1 wherein the protector assembly comprises a fastener for fastening the cushion member in the retention position.

11. A protector according to claim 10 wherein a proximal end of the base member and a proximal end of the cushion member are formed with an aperture extending therethrough, the aperture in the base member aligning with the aperture in the cushion member when the cushion member is in the retention position, whereby the fastener extends through the apertures for retaining the cushion member in the retention position.

12. A protector according to claim 11 wherein the fastening member is a bolt with a nut wherein the shaft of the bolt is located in the aperture.

13. A protector according to claim 11 wherein the fastener comprises a clip having a lug which is located in the aperture.

14. A protector according to claim 11 wherein the fastener is formed integrally with the cushion member and/or the base member.

15. A protector according to claim 14 wherein the fastener is formed integrally with the mounting portion.

16. A protector according to claim 15 wherein the fastener is biased towards an active position, in which position it engages the base member to fasten the cushion member in the retention position.

17. A protector according to claim 16 wherein the fastener comprises a shoulder which abuts the retainer when the fastener is in the active position.

18. The protector according to claim 15, wherein the fastener is in the shape of an arrow head.

\* \* \* \* \*